(12) United States Patent
Wagner, III

(10) Patent No.: US 11,745,988 B2
(45) Date of Patent: Sep. 5, 2023

(54) PORTABLE CHEMICAL TOILET WITH LEVELING DEVICE

(71) Applicant: Fred A. Wagner, III, Charlotte, NC (US)

(72) Inventor: Fred A. Wagner, III, Charlotte, NC (US)

(73) Assignee: Fred A. Wagner, III, Charlotte, NC (US)

( * ) Notice: Subject to any disclaimer, the term of this patent is extended or adjusted under 35 U.S.C. 154(b) by 0 days.

(21) Appl. No.: 17/830,914

(22) Filed: Jun. 2, 2022

(65) Prior Publication Data

US 2022/0388819 A1 Dec. 8, 2022

Related U.S. Application Data

(60) Provisional application No. 63/196,782, filed on Jun. 4, 2021.

(51) Int. Cl.
*A47K 11/02* (2006.01)
*B66F 3/08* (2006.01)

(52) U.S. Cl.
CPC .............. *B66F 3/08* (2013.01); *A47K 11/02* (2013.01)

(58) Field of Classification Search
CPC .......... A47K 11/02; B66F 3/08; E04H 1/1216
USPC ................ 248/188.2, 188.4; 52/126.1, 126.7
See application file for complete search history.

(56) References Cited

U.S. PATENT DOCUMENTS

| | | | | |
|---|---|---|---|---|
| 5,192,428 A | * | 3/1993 | Lindstrom | A47K 11/02 71/42 |
| 8,632,038 B2 | * | 1/2014 | Christian | A47B 91/00 248/188.4 |
| 10,329,783 B2 | * | 6/2019 | Sansom, III | A47K 11/02 |

* cited by examiner

*Primary Examiner* — Janie M Loeppke
(74) *Attorney, Agent, or Firm* — Hammer & Associates, P.C.

(57) ABSTRACT

A portable toilet is mounted on a skid. The skid has a pair of horizontal members with a terminal end with a vertically oriented hole. A leveler affixed to the horizontal member at the terminal end via a connector with a first vertical hole laterally spaced away from a second vertical hole. An anchor bolt is associated with the first vertical hole and engageable with the vertically oriented hole in the skid's horizontal member, thereby fastening the leveler to the toilet. A leveler bolt is threadingly engaging the second vertical hole for movement in a vertical direction in relationship to the toilet; and a foot associated with a lower terminal end of the leveler bolt. Whereby when the leveler is anchored to the skid and the leveler bolt is engaged with the foot, the portable toilet may be leveled by movement of the leveler bolt.

14 Claims, 4 Drawing Sheets

PORTABLE CHEMICAL TOILET WITH LEVELING DEVICE

RELATED APPLICATION

This application claims the benefit of U.S. Provisional Patent Application Ser. No. 63/196,782 filed Jun. 4, 2021, incorporated herein by reference.

FIELD OF THE INVENTION

The invention is directed toward a portable chemical toilet (also know as, for example, port-a-potty, portaloo, and/or honey bucket) with a leveling device affixed thereto.

BACKGROUND

A portable chemical toilet (also known as: 'port-a-john' or 'porta-potty' or 'portaloo' or 'honey bucket') are toilets that are often seen at constructions sites and at events, mostly outdoor events (e.g., festivals, concerts, parades, and the like), see 'Chemical toilet,' www.wikipedia.com; 'Portable toilet,' www.wikipedia.com; and/or 'What is a Chemical toilet?' www.wisegeek.com, each incorporated herein by reference. These toilets are generally made from a molded plastic shell with four side walls and a door in one of the side walls, a top, a floor, a toilet within the shell, and are mounted on a skid. These toilets are widely used and recognizable.

In use, these toilets may be placed on uneven (or not level) ground. Using a toilet that is unevenly set may be unsettling to some and thereby inhibit the use of such a toilet. Uneven toilets are also more likely to be tipped over.

Accordingly, there is a need for quickly leveling these toilets, so that they are more attractive for use.

SUMMARY OF THE INVENTION

A portable toilet is mounted on a skid. The skid has a pair of horizontal members with a terminal end with a vertically oriented hole. A leveler affixed to the horizontal member at the terminal end via a connector with a first vertical hole laterally spaced away from a second vertical hole. An anchor bolt is associated with the first vertical hole and engageable with the vertically oriented hole in the skid's horizontal member, thereby fastening the leveler to the toilet. A leveler bolt is threadingly engaging the second vertical hole for movement in a vertical direction in relationship to the toilet; and a foot associated with a lower terminal end of the leveler bolt. Whereby when the leveler is anchored to the skid and the leveler bolt is engaged with the foot, the portable toilet may be leveled by movement of the leveler bolt.

DESCRIPTION OF THE DRAWINGS

For the purpose of illustrating the invention, there is shown in the drawings a form that is presently preferred; it being understood, however, that this invention is not limited to the precise arrangements and instrumentalities shown.

DESCRIPTION OF THE INVENTION

Figure 1:
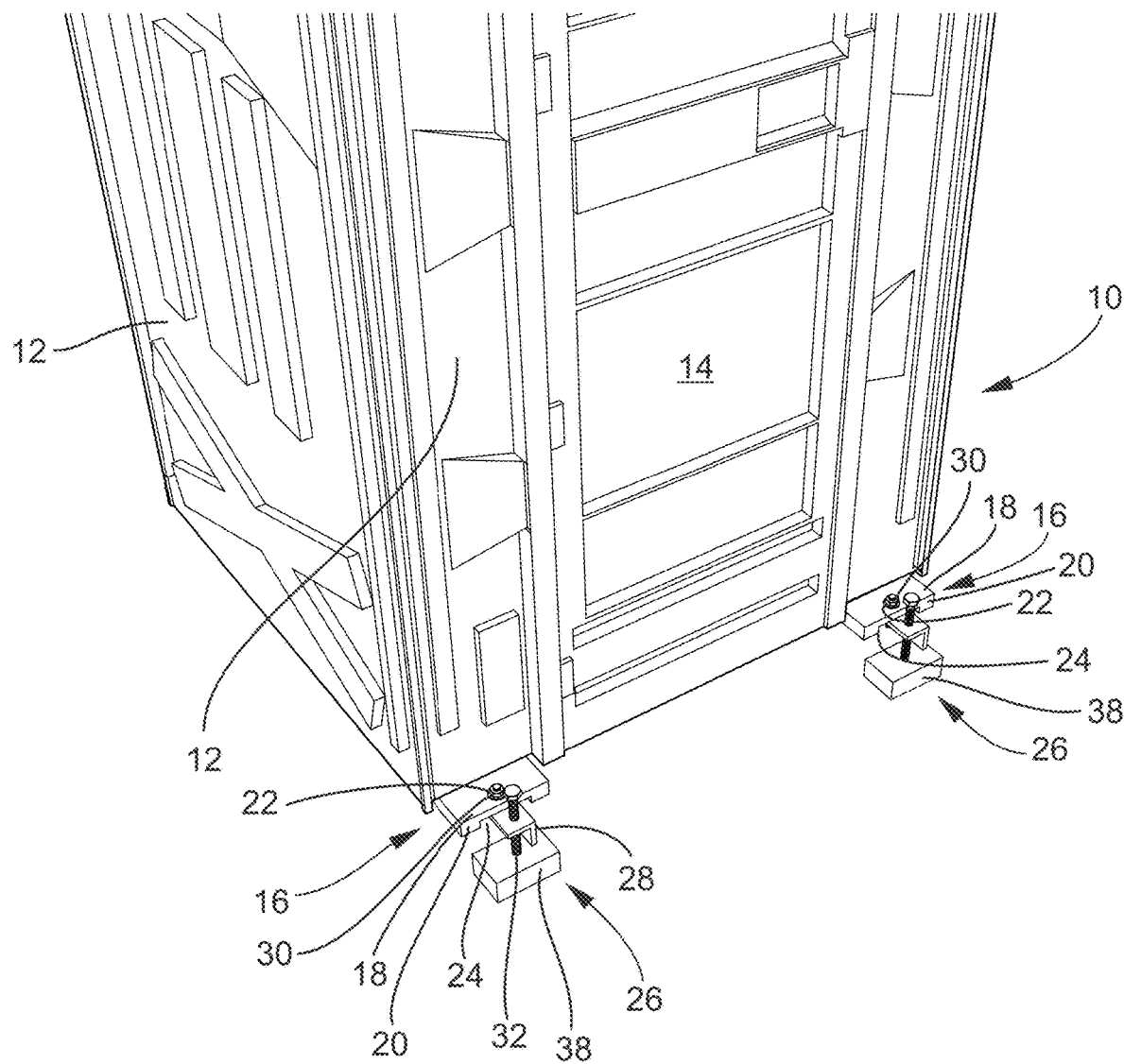
FIG. 1 illustrates an embodiment of the instant invention.

Referring to the drawings were like numerals indicate like elements, there is shown in FIG. 1 a portable chemical toilet 10 with a leveler 26.

Toilet 10 is conventional and generally includes side walls 12, a door 14 in one wall 12. The toilet 10 is mounted on a skid 16. The skid 16 has a pair of horizontal members 18. The horizontal members 18 have terminal ends 20 with a vertical through hole 22 and a channel 24 running longitudinally along the member's bottom surface.

Figure 2:
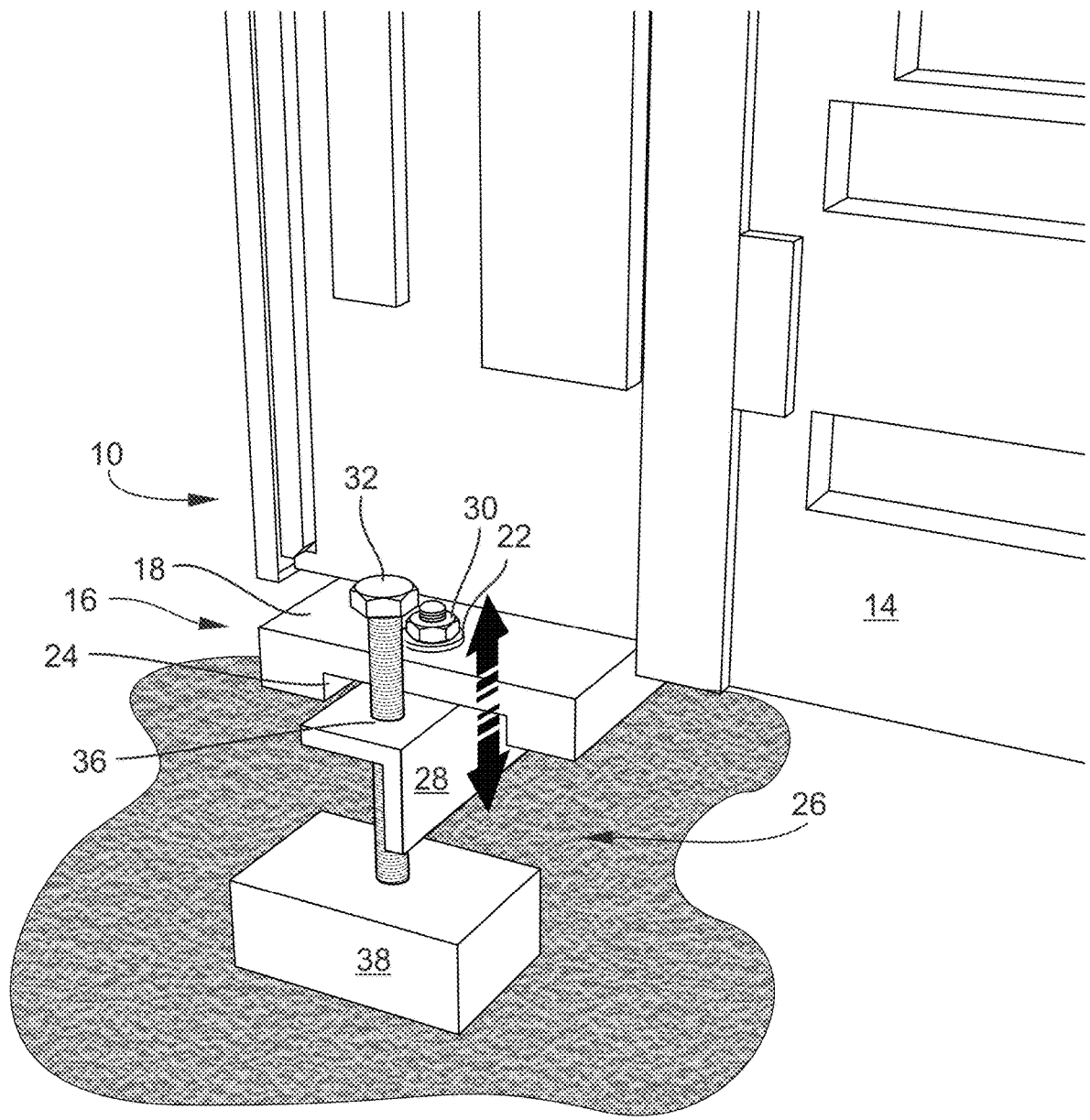
FIG. 2 illustrates a leveler affixed to the toilet.
Figure 3:
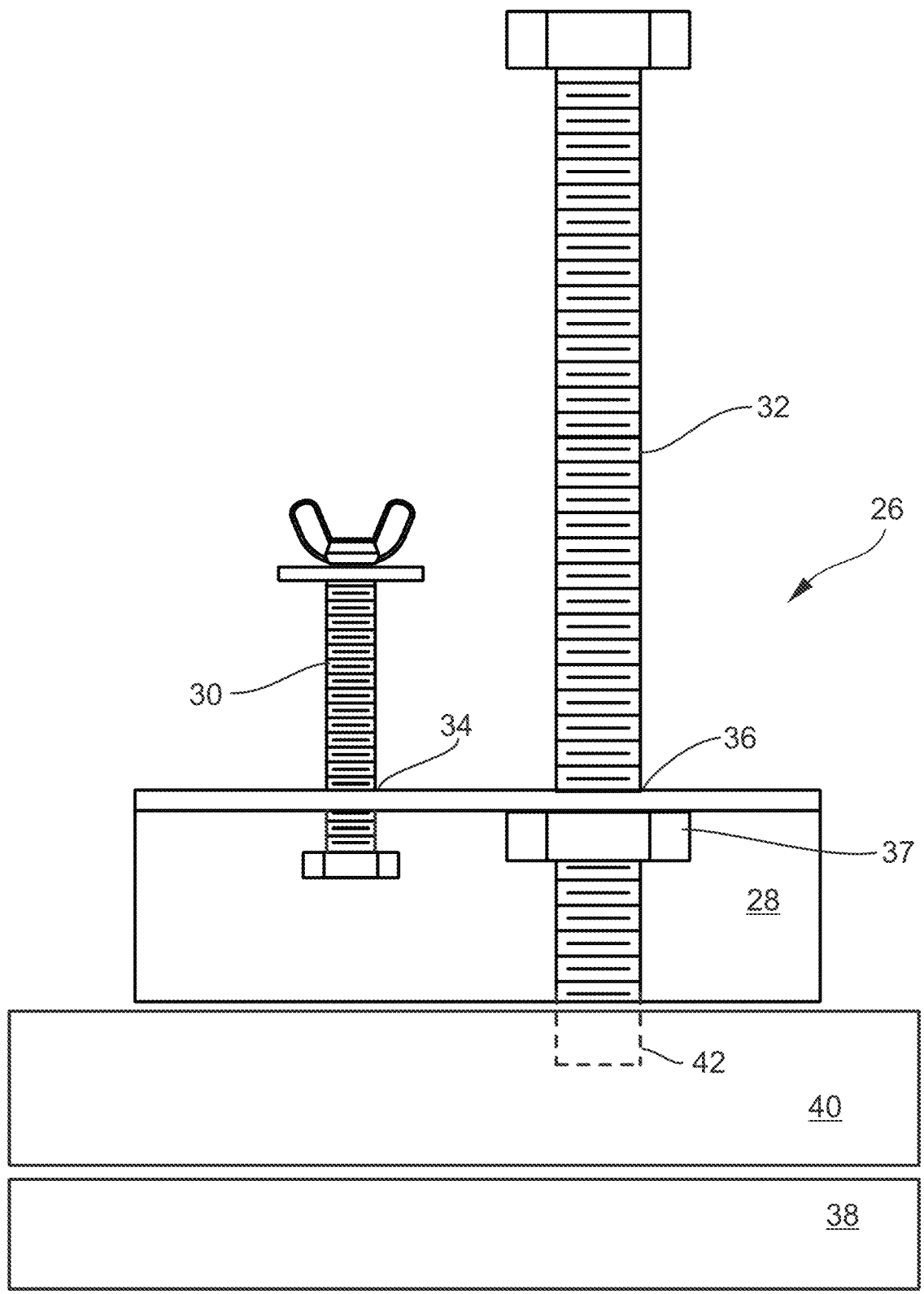
FIG. 3 illustrates the leveler.

FIGS. 2 and 3 show the leveler 26 affixed to one horizontal member 18 of skid 16 at the bottom of the toilet 10. The leveler 26 includes a connector 28 that may be sized to fit into channel 24. Connector 26 may be a piece of L-shaped angle iron (steel). Connector 28 has a first vertical through hole 34 and a second vertical through hole 36 laterally spaced from the hole 34. An anchor bolt 30 is adapted to connect horizontal member 18 and connector 28 via hole 22 and hole 34 (washers and lock washers may be used). Leveler bolt 32 threadingly engages connector 28, for example via nut 37 affixed to connector 28. Foot 38 is in bearing engagement with terminal end of the anchor bolt 32. Foot 38 may be expandible in a vertical direction by the inclusion of additional blocks 40 that may be secured to foot 38 via screws/bolts through predrilled holes (not shown). Foot 38 may include a blind hole 42 for receipt of the terminal end of the leveler bolt 32.

Figure 4B:
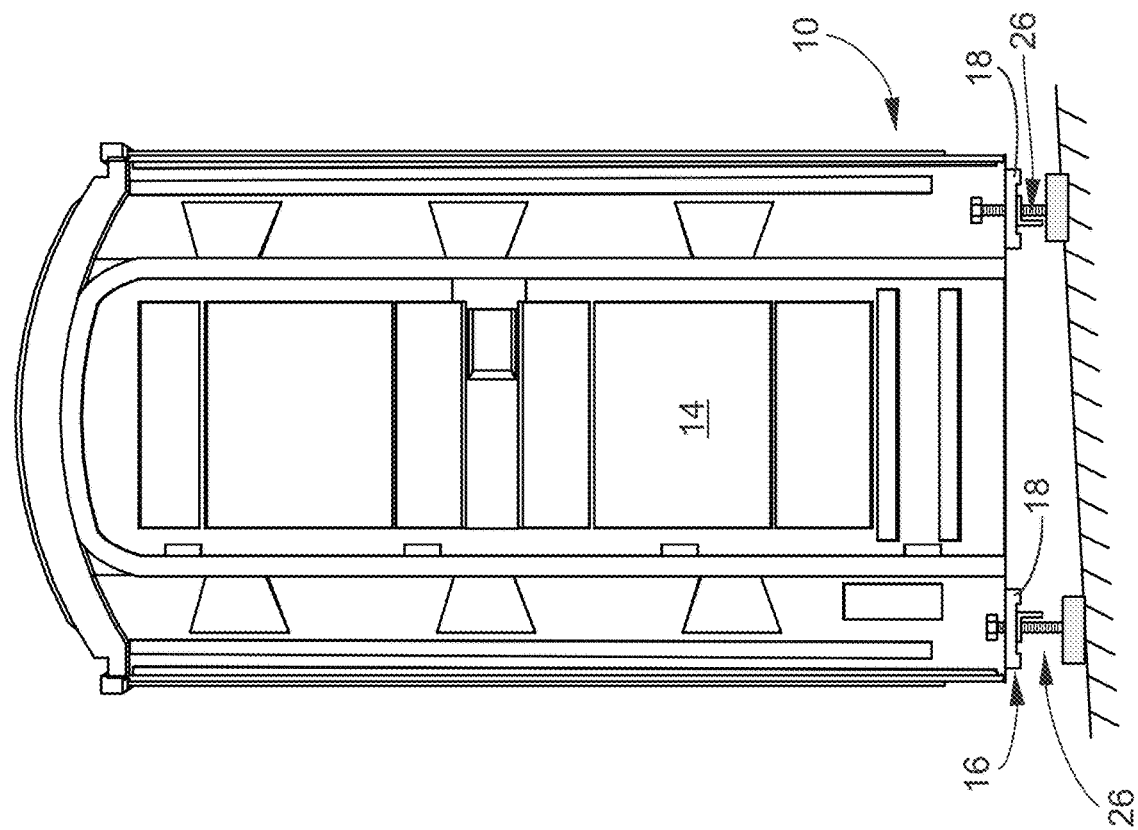
FIGS. 4A and 4B illustrate the operation of the invention.
Figure 4A:
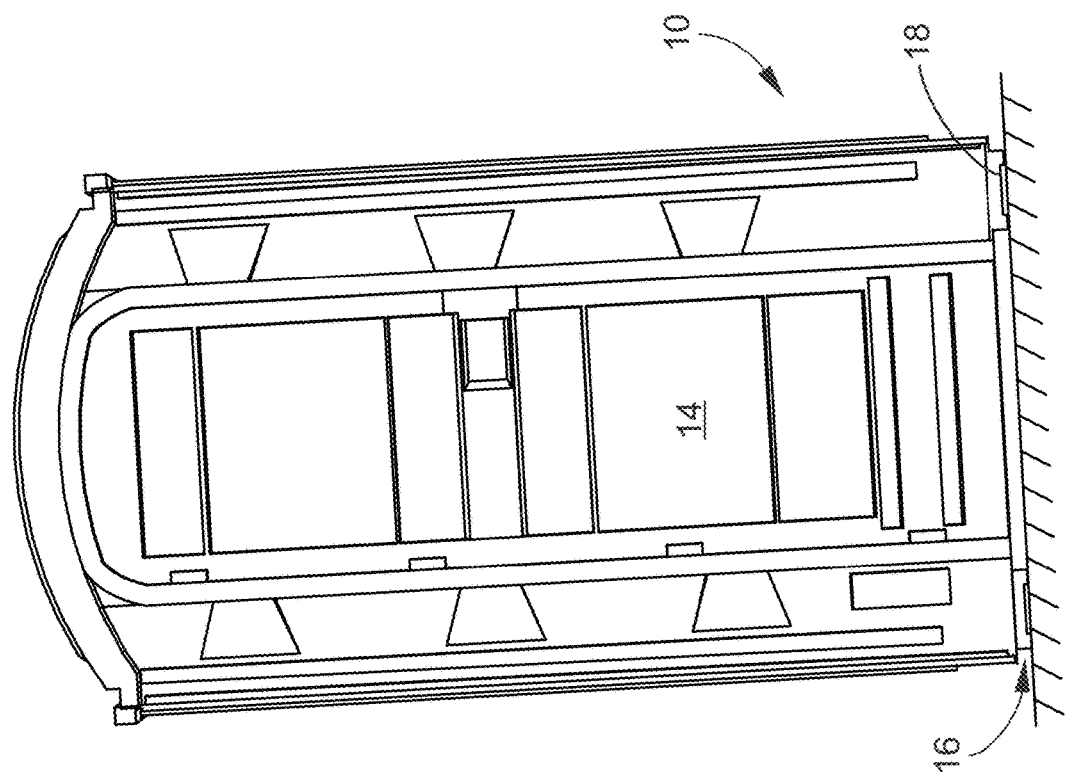

FIGS. 4A and 4B show how the leveler(s) 26 may be used to plumb the portable toilet 10 on uneven ground. In use, the leveler 26 is fastened to the toilet 10 and then the leveler bolts 32 are twisted till the toilet 10 is plumb. Foot 38 may be wood or plastic.

The present invention may be embodied in other forms without departing from the spirit and the essential attributes thereof, and, accordingly, reference should be made to the appended claims, rather than to the foregoing specification, as indicating the scope of the invention.

I claim:

1. A portable toilet comprises:
    a toilet body mounted on a skid, the skid having a pair of horizontal members, each horizontal member having a terminal end with a vertically oriented hole adjacent each terminal end,
    a leveler affixed to the horizontal member at the terminal end includes
    a connector with a first vertical through hole laterally spaced away from a second vertical through hole;
    an anchor bolt associated with the first vertical through hole and engageable with the vertically oriented hole in the horizontal member of the skid, thereby fastening the leveler to the portable chemical toilet;
    a leveler bolt threadingly engaging the second vertical through hole for movement in a vertical direction in relationship to the portable toilet; and
    a foot associated with a lower terminal end of the leveler bolt,
    whereby when the leveler is anchored to the skid and the leveler bolt is engaged with the foot, the portable toilet may be leveled by movement of the leveler bolt.

2. The portable toilet of claim 1 wherein the connector is L-shaped.

3. The portable toilet of claim 2 wherein the connector is a steel angle iron.

4. The portable toilet of claim 1 wherein the horizontal member of the skid having a channel along a bottom surface thereof and sized for the receipt of the connector.

5. The portable toilet of claim 1 wherein the foot is wood or plastic.

6. The portable toilet of claim 1 wherein the foot is expandible in the vertical direction by the inclusion of additional spacers.

7. The portable toilet of claim 6 wherein the foot is predrilled to facilitate expansion.

8. A method for leveling a portable toilet mounted on a skid, the skid having a horizontal member with a vertically oriented through hole adjacent each terminal end of the horizontal end comprising the steps of:

provideing a leveler including a connector with a first vertical through hole laterally spaced away from a second vertical through hole, an anchor bolt associated with the first vertical through hole and engageable with the vertically oriented hole in the horizontal member of the skid, a leveler bolt threadingly engaging the second vertical through hole for movement in a vertical direction in relationship to the portable toilet; and a foot associated with a lower terminal end of the leveler bolt;

anchoring the leveler to the horizontal skid member via the anchor bolt; and leveling the portable toilet by turning the leveler bolt whereby the portable toilet may be leveled movement of the leveler bolt.

9. The method of claim 8 wherein the connector is L-shaped.

10. The method of claim 9 wherein the connector is a steel angle iron.

11. The method of claim 8 wherein the foot is wood or plastic.

12. The method of claim 8 wherein the horizontal member of the skid having a channel along a bottom surface thereof and sized for the receipt of the connector.

13. The method of claim 8 wherein the foot is expandible in the vertical direction by the inclusion of additional spacers.

14. The method of claim 13 wherein the foot is predrilled to facilitate expansion.

* * * * *